(12) United States Patent
Boyer et al.

(10) Patent No.: US 11,772,475 B2
(45) Date of Patent: Oct. 3, 2023

(54) METHOD FOR INSPECTING AND FOR MAINTAINING AN AUTOMOTIVE VEHICLE

(71) Applicants: Continental Automotive France, Toulouse (FR); Continental Automotive GmbH, Hannover (DE)

(72) Inventors: Jean-Luc Boyer, Tournefeuille (FR); Jacques Rocher, Saint Orens de Gameville (FR)

(73) Assignee: VITESCO TECHNOLOGIES GMBH, Regensburg (DE)

( * ) Notice: Subject to any disclaimer, the term of this patent is extended or adjusted under 35 U.S.C. 154(b) by 1162 days.

(21) Appl. No.: 16/332,432

(22) PCT Filed: Sep. 11, 2017

(86) PCT No.: PCT/FR2017/052400
§ 371 (c)(1),
(2) Date: Mar. 12, 2019

(87) PCT Pub. No.: WO2018/050992
PCT Pub. Date: Mar. 22, 2018

(65) Prior Publication Data
US 2021/0206253 A1 Jul. 8, 2021

(30) Foreign Application Priority Data
Sep. 14, 2016 (FR) ...................... 1658587

(51) Int. Cl.
*B60K 5/12* (2006.01)
*G05B 19/33* (2006.01)

(52) U.S. Cl.
CPC ............... *B60K 5/12* (2013.01); *G05B 19/33* (2013.01); *G05B 2219/42237* (2013.01)

(58) Field of Classification Search
CPC ...................... G05B 19/33; G05B 2219/42237
See application file for complete search history.

(56) References Cited

U.S. PATENT DOCUMENTS 3,571,578 A 3/1971 Fry
9,242,645 B2 1/2016 Kim et al.
(Continued)

FOREIGN PATENT DOCUMENTS

CN 101254785 A 9/2008
CN 103477116 A 12/2013
(Continued)

OTHER PUBLICATIONS

International Search Report and Written Opinion for International Application No. PCT/FR2017/052400, dated Jan. 23, 2018—8 pages.
(Continued)

*Primary Examiner* — Nathan L Laughlin
(74) *Attorney, Agent, or Firm* — RatnerPrestia

(57) ABSTRACT

A method for inspecting and maintaining a motor vehicle including at least one actuator controlled by at least one electronic computer, and a supervision computer. The inspection and maintenance method including: a) coupling the supervision computer, b) interrogating the electronic computer, if an anomaly is present on at least one actuator, then the method includes: c) identifying the defective actuator, d) launching a test campaign involving: 1) reading predefined values, 2) applying a control signal to the actuator, 3) measuring actuation parameters of the actuator, 4) analyzing the results, e) proposing new parameters, f) applying the control signal with the new parameters, and g) recording the new parameters in the electronic computer.

12 Claims, 4 Drawing Sheets

(56) References Cited

U.S. PATENT DOCUMENTS

| | | | |
|---|---|---|---|
| 9,857,776 B2 | 1/2018 | Watai et al. | |
| 2004/0260422 A1* | 12/2004 | Greenwood | B25J 9/1692 |
| | | | 700/193 |
| 2008/0010035 A1* | 1/2008 | Chirico | G07C 3/00 |
| | | | 702/108 |
| 2008/0208426 A1 | 8/2008 | Iwasaki et al. | |
| 2008/0221751 A1* | 9/2008 | Fink | G01R 31/007 |
| | | | 701/33.4 |
| 2010/0295491 A1* | 11/2010 | Schulz | G01R 31/346 |
| | | | 180/65.285 |
| 2013/0268122 A1 | 10/2013 | Desai et al. | |
| 2014/0117918 A1 | 5/2014 | Park | |
| 2015/0371461 A1* | 12/2015 | Treharne | G07C 5/0816 |
| | | | 701/31.4 |
| 2016/0160780 A1* | 6/2016 | Garrard | G07C 5/006 |
| | | | 701/29.2 |

FOREIGN PATENT DOCUMENTS

| | | | |
|---|---|---|---|
| CN | 104554246 A | 4/2015 | |
| EP | 2696099 A1 | 2/2014 | |

OTHER PUBLICATIONS

Chinese Office Action for Chinese Application No. 201780070050.9, dated Jun. 6, 2022 with translation, 16 pages.

\* cited by examiner

METHOD FOR INSPECTING AND FOR MAINTAINING AN AUTOMOTIVE VEHICLE

CROSS REFERENCE TO RELATED APPLICATIONS

This application is the U.S. National Phase Application of PCT International Application No. PCT/FR2017/052400, filed Sep. 11, 2017, which claims priority to French Patent Application No. 1658587, filed Sep. 14, 2016, the contents of such applications being incorporated by reference herein.

FIELD OF THE INVENTION

The present invention generally pertains to the management and to the maintenance of an electronic device.

It relates more particularly to a method for inspecting and maintaining an electronic assembly including at least one electronic computer and an actuator.

The invention is applicable in particular in the automotive field. It is able to be implemented for example during annual maintenance of a motor vehicle without requiring disassembly.

BACKGROUND OF THE INVENTION

A motor vehicle nowadays contains an increasing amount of on-board electronics. Electronic computers are thus increasingly present in our vehicles, and are dedicated for example to managing the passenger compartment, braking, but also to engine management. These electronic computers control loads, such as for example injectors, valves and electric motors. It may be for example an electronic throttle control (ETC) device, or an exhaust gas recirculation valve, also called EGR device. These loads are primarily inductive loads.

A current called a control current is injected into said inductive load (also called actuator) and makes it possible for example to electrically control the opening thereof. This electrical control is more often than not performed using a control signal having a fixed frequency and a variable duty cycle. This type of signal is also called a PWM, from the acronym for "pulse width modulation", control signal by those skilled in the art.

The frequency of the control signal is fixed when the electronic computer is designed, depending on the actuator to be controlled, and also on the constraints of the electronic controls. The choice of the frequency of the control signal is important in several respects, ranging from switching noise in an audible frequency of the actuators to the reliability of said actuator. The impact of the choice of the frequency of the control signal on the actuator is documented non-exhaustively below.

More generally, a low frequency is chosen for controlling an actuator so as to:
- reduce the heat dissipation and therefore the heating of the components during switching operations,
- reduce the stress for the electronic components,
- reduce electromagnetic emissions,
- reduce the sensitivity of the wiring harnesses of the vehicle to ageing.

However, the choice of a low frequency may generate noise in audible frequencies, which may disrupt the driver.

Choosing a higher frequency of the control signal allows a more stable current value in the actuator, and also makes it possible to limit the audible noise thus generated if the frequency is higher than 10 kHz.

To optimize the use of the actuators, some of them are controlled with a control signal having two frequencies. It is thus known for example that, to inspect certain types of injector, a first frequency of the control signal is selected when the engine is below a minimum engine speed and a second frequency of the control signal is selected when the thermal combustion engine is above said minimum engine speed. By virtue of such control, both pleasant driving conditions for the driver and optimization of the reliability of the components of the motor vehicle are taken into account.

As the motor vehicle is subjected to wear, the electromagnetic behavior of the actuator may change for example due to its mechanical ageing. The electronic computer is able to compensate the change in behavior of the actuator by monitoring the response time of said actuator, for example. However, as the control signal has an unchangeable fixed frequency (or two fixed frequencies) that is recorded in the electronic computer when the latter is designed, it is impossible to change the frequency of the control signal so as to control the actuator in a more suitable manner so as to take into account its ageing.

SUMMARY OF THE INVENTION

An aspect of the invention proposes a method intended for the inspection and for the maintenance of a motor vehicle, making it possible to partly or fully rectify the technical defect of the cited prior art.

To this end, a first aspect of the invention proposes a method for inspecting and maintaining a motor vehicle including at least one actuator controlled by at least one electronic computer; the electronic computer including, inter alia, a memory, a microcontroller, a power module, a first communication and control bus, a connector, the microcontroller being designed to control the actuator using the power module on the basis of a given strategy; supervision means able to be coupled to the connector via a connecting cable so as to logically access the electronic computer, the inspection and maintenance method including the following steps:

a) coupling the supervision means to the electronic computer by way of the connector,
b) interrogating the computer using the supervision means and displaying the state of the motor vehicle, if an anomaly is present and is communicated by the electronic computer to the supervision means, then the method includes the following steps:
c) identifying the defective actuator,
d) launching a test campaign involving:
 1) reading predefined values corresponding to the defective actuator from the memory,
 2) applying a control signal with the predefined values read from the memory to the actuator,
 3) measuring actuation parameters of the actuator in response to the application of the control signal,
 4) analyzing the results of the actuation parameters of the actuator,
e) proposing new parameters for the control signal,
f) applying the control signal with the new parameters to the actuator, measuring and analyzing the actuation parameters,
g) recording the new control parameters now being used in the electronic computer.

By virtue of the method of an aspect of the invention, it is possible to test an actuator identified as being defective by the electronic computer and to observe whether the actuator has drifted in its performance.

In one exemplary embodiment of the method, the control signal has a duty cycle and a frequency that are able to be changed, making it possible to test the actuator and thus potentially detect a drift in its performance.

To optimize control of the actuator, it is proposed for example for the control signal to be a pulse width modulation signal.

In one variant, to optimize the testing of the actuator, the predefined values recorded in the memory of the electronic computer correspond at least to a value of a first frequency of the control signal. Advantageously, it is now possible, by virtue of the predefined values stored in the memory, to test the actuator with a control signal that has known values and references, thereby making it possible for example to establish the drift, or lack thereof, of the actuator with respect to its original state. Original state is understood here to mean its typical performance.

In order that the test campaign does not last too long, it is proposed for example, in step d)2), for the control signal to be applied to the actuator only for a variable given duration.

To optimally characterize the actuator, it is proposed for example for the actuation parameters of the actuator to be a positioning of said actuator. Thus, if the positioning of the actuator in response to the control signal (with a predefined value) does not correspond to what is expected, then the actuator will be considered to be outside manufacturer specification for this predefined value, and therefore as being potentially defective.

As a variant, the actuation parameters of the actuator are a response time.

Also proposed is a device for inspecting and maintaining a motor vehicle; the motor vehicle including at least one actuator controlled by at least one electronic computer; the electronic computer including, inter alia, a memory, a microcontroller, a power module, a first communication and control bus, a connector, the microcontroller being designed to control the actuator using the power module on the basis of a given strategy; supervision means able to be coupled to the connector via a connecting cable so as to access the electronic computer, the device for inspecting and maintaining the motor vehicle being characterized in that the computer is designed to generate a control signal able to control the actuator, said control signal having a frequency and a duty cycle that are able to be adjusted, and in that the supervision means are designed to change at least a frequency of the control signal.

BRIEF DESCRIPTION OF THE DRAWINGS

Other features and advantages of aspects of the invention will become more apparent upon reading the following description. This description is purely illustrative and should be read with reference to the appended drawings, in which.

DETAILED DESCRIPTION OF THE PREFERRED EMBODIMENTS

Figure 1:
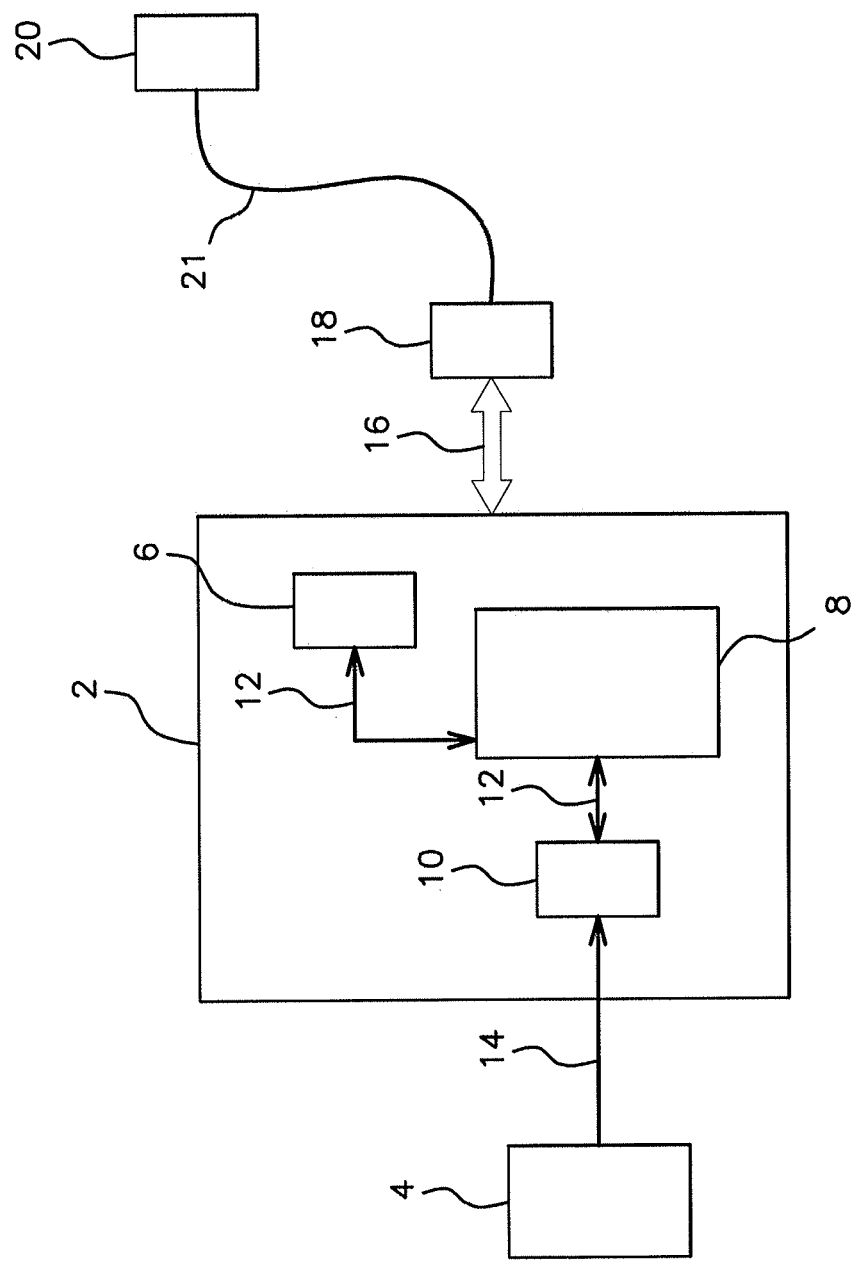
FIG. 1 is a circuit diagram of an electronic computer coupled to an actuator.

FIG. 1 shows a simplified circuit diagram of an electronic computer 2 able to be installed in a motor vehicle equipped with a thermal combustion or hybrid technology engine. In the example of FIG. 1, the electronic computer 2 is coupled to an actuator 4. Of course, depending on the application, the electronic computer 2 may control a plurality of actuators 4. The electronic computer 2 may for example be an engine control computer and the actuator 4 may be an electronic throttle control device. These examples are purely illustrative and in no way limit the scope of aspects of the invention.

The electronic computer 2 includes, inter alia, a memory 6 designed to store computer programs, a microcontroller 8 designed to execute computer programs possibly stored in the memory 6, a power module 10 and a first communication and control bus 12.

The memory 6 is for example a read-only memory or ROM; it may also be an electrically erasable programmable read-only memory or EEPROM. The microcontroller 8 is for example a 32-bit multicore microcontroller clocked at a frequency of 128 MHz. The power module 10 is designed to convert control signals coming from the communication and control bus 12 into what are called power signals for controlling the actuator 4. To control the actuator 4, a second power bus 14 couples the electronic computer 2, and more specifically the power module 10, to the actuator 4. The first communication and control bus 12 is for example a serial peripheral interface or SPI communication bus. Of course, those skilled in the art will readily understand, upon reading the above paragraphs and the drawings, that only the units useful to understanding aspects of the invention have been described. Furthermore, the types of components used and presented briefly above are given purely by way of illustration.

A maintenance bus 16 is designed to couple the electronic computer 2 to a connector 18 positioned in the passenger compartment of the vehicle, for example. When a supervision computer 20 is coupled to the connector 18 using a connecting cable 21, then data coming from the electronic computer 2 transit via the maintenance bus 16 to the supervision computer 20. These data may for example contain states of the modules of the electronic computer 2 and also of the actuator 4. They may also contain information on faults or events that have occurred over a predetermined period, for example since the last time the vehicle visited a garage. This information is thus available on a screen of the supervision computer 20 and allows a qualified individual who is to intervene on the motor vehicle to ascertain the state thereof. Furthermore, the supervision computer 20 is also designed to reconfigure the electronic computer 2 during an inspection and maintenance method that will be presented below.

Figure 2:
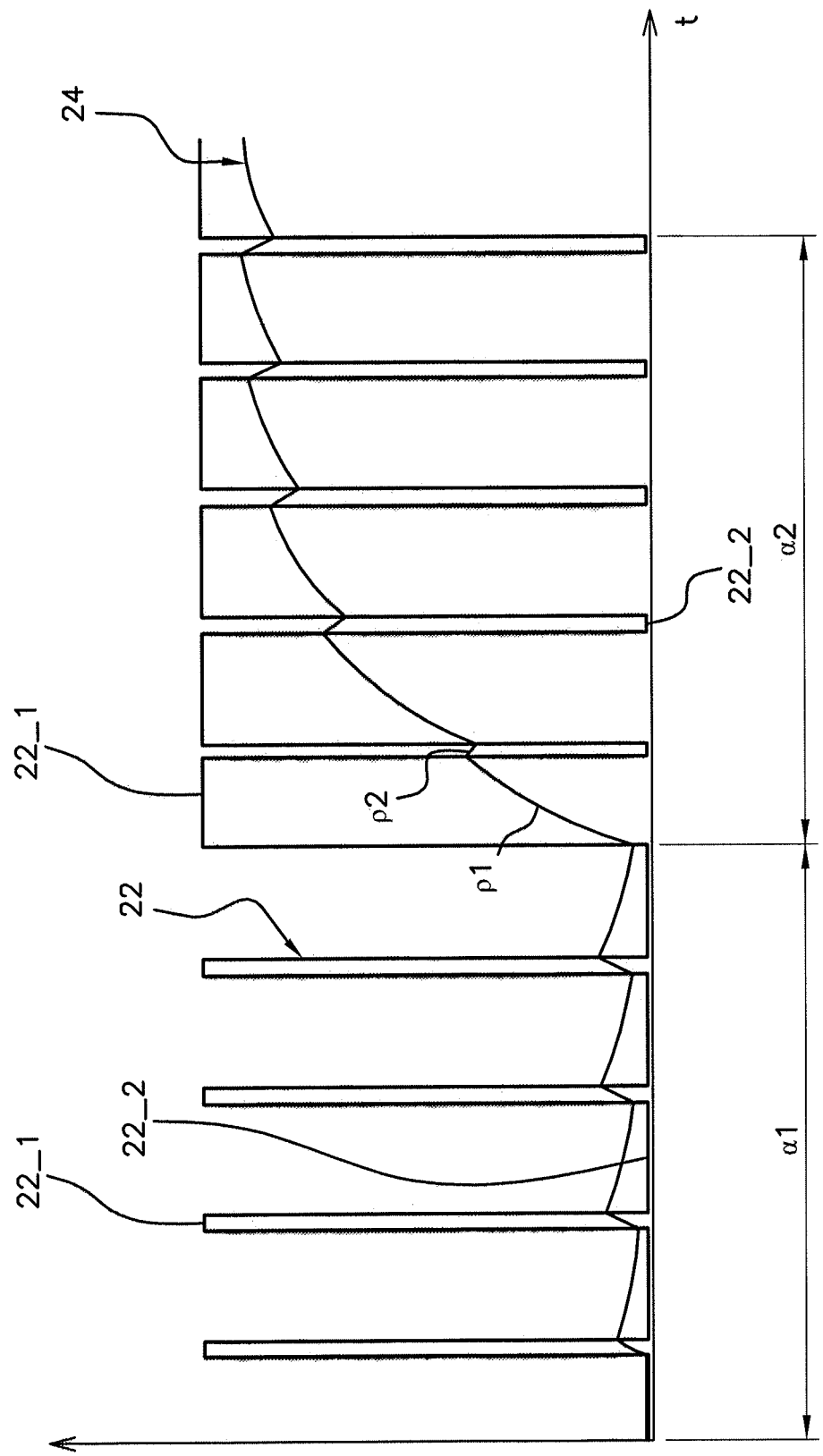
FIG. 2 is a graph showing a control signal applied to the actuator of FIG. 1, and also a signal at the terminals of the actuator in response to the applied control signal.

The actuator 4 is controlled by the electronic computer 2 via the second power bus 14 by way of a control signal 22. FIG. 2 shows the control signal 22 as a function of time. The control signal 22 is a pulse width modulation or PWM signal. As is known to those skilled in the art, this type of signal is preferably used to control the actuator 4. It is recalled that this type of actuator 4 is primarily formed of an inductive load.

The control signal 22 is characterized by a high state 22_1 of duration t1, a low state 22_2 of duration t2, a frequency f and a duty cycle a. The frequency f, as is known to those skilled in the art, is equal to the reciprocal of the sum of the durations t1 and t2, also called period. The duty cycle a of the control signal 22 is characterized by the duration of the high state t1 divided by the period. The actuator 4 is preferably controlled by the control signal 22 with a duty cycle a of between 20% and 80%. The frequency f of the control signal 22 is determined when the electronic computer 2 is designed, primarily depending on the type of actuator 4 to be controlled. Thus, for example, the frequency f of the control signal 22 is between 1 kHz and 10 kHz. Of course, these values are given purely by way of illustration and are liable to change depending on the actuator 4 to be controlled.

A response signal 24 representative of the current flowing through the actuator 4 in response to the control signal 22 is also shown in FIG. 2. Those skilled in the art will recognize, in the form of the response signal 24, the evolution of a current in an inductive load. Thus, in the high state t1 of the control signal 22, the current in the actuator 4 increases as a function of a first gradient p1, and, in the low state t2, decreases as a function of a second gradient p2. The first gradient p1 and the second gradient p2 do not necessarily have the same value.

To illustrate the influence of the duty cycle a on the current in the actuator 4 and therefore on its load, the control signal 22 has a first duty cycle a1 and a second duty cycle a2. In the example of FIG. 2, the first duty cycle a1 is of the order of 20% and the second duty cycle a2 is of the order of 80%. Thus, as may be seen in this figure, the load illustrated by the rise in the current in the actuator 4 and therefore by the rise in the response signal 24 is larger in the case where the duty cycle a of the control signal 22 is high. Thus, to obtain a high current in the actuator 4, it will be preferable to have a control signal 22 with a relatively low frequency f and a high duty cycle a, rather than a control signal 22 with a high frequency f and a low duty cycle a. Of course, the frequency f and duty cycle a pair of the control signal 22 depends on the type of actuator 4 and also on the environment, that is to say on the field of application of the actuator 4 in the motor vehicle.

During the life of the motor vehicle, the actuator 4 is subjected to wear, and it may sometimes be the case that its intrinsic characteristics evolve and lead to a change in its behavior in response to the control signal 22 that however does not require it to be changed for a new actuator 4.

The changes in the intrinsic characteristics of the actuator 4 may be for example a change in the response time of the actuator 4 or a noise that is generated when the actuator 4 is activated, which may be disruptive for the driver of the vehicle. The changes in the intrinsic characteristics of the actuator 4 may also sometimes generate what are called non-reproducible random faults. These faults are difficult to detect for the qualified individual and are additionally disruptive to the driver of the motor vehicle.

As was mentioned above in the description, the frequency of the control signal 22 is generally fixed when the electronic computer 2 is designed depending on the type of actuator 4 to be controlled and also depending on its environment. Thus, for example if the actuator 4 to be controlled is an injector, then the frequency of the control signal 22 will have to be selected such that the noise generated during the activation of the actuator 4 is minimal when the thermal combustion engine is idling, so as not to disturb the driver. However, if the actuator 4 drifts from its intrinsic characteristics and/or when it emits noise, it is virtually impossible to rectify these faults through adjustments if the frequency f of the control signal 22 is fixed and unchangeable. Unfortunately, this solution (changing the actuator 4 in the case illustrated above) is not a very economical solution for the driver, and is also not very environmentally friendly. Specifically, said actuator 4 has definitely drifted from its intrinsic characteristics on account of its wear, but is still fine if just a few parameters of the control signal 22 were able to be changed.

An aspect of the present invention proposes a method for inspecting and maintaining at least one actuator 4 controlled by at least one electronic computer 2. In one preferred embodiment, the method of an aspect of the present invention is performed during an inspection and maintenance phase in a certified motor vehicle garage by a qualified individual.

Figure 3:
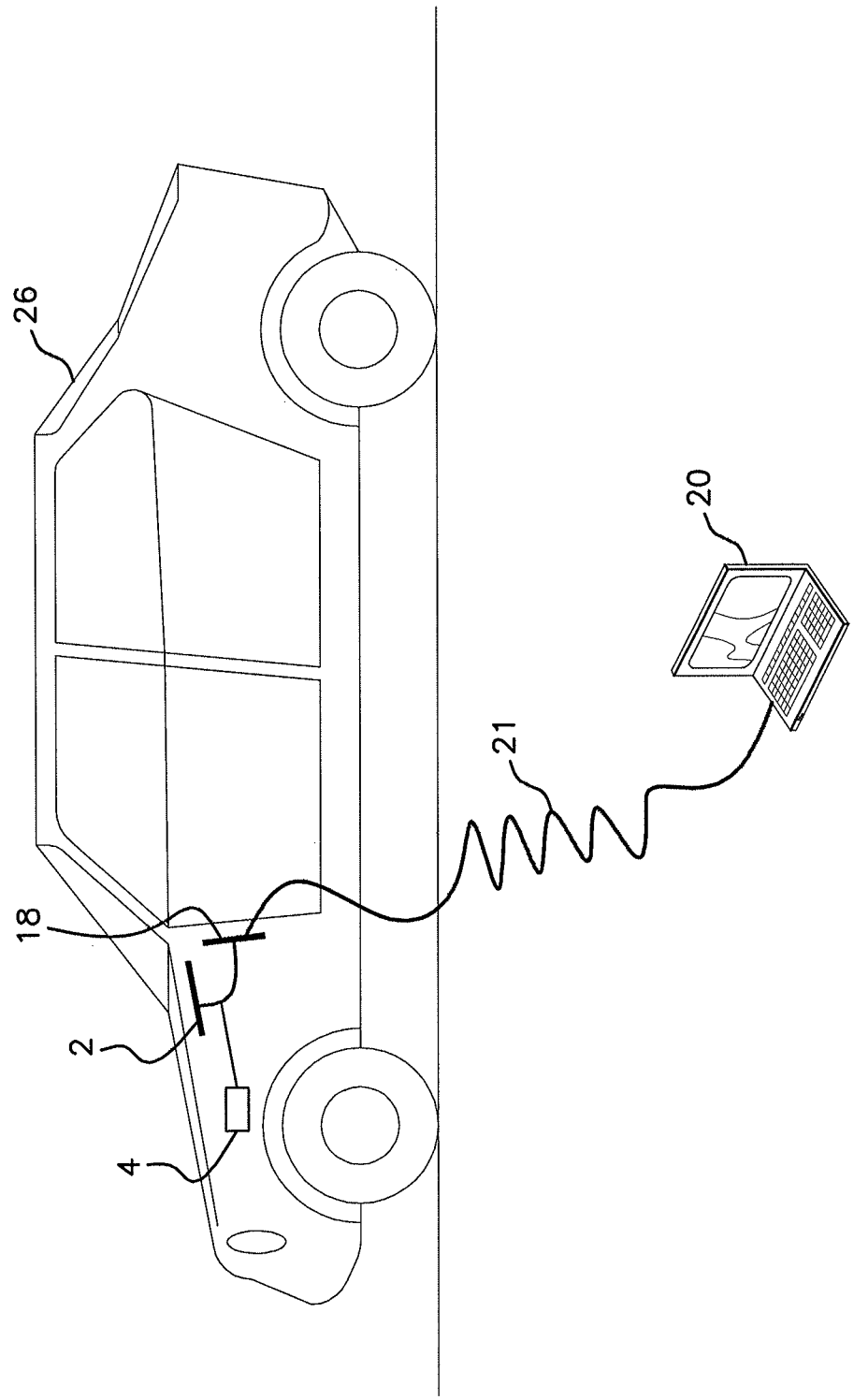
FIG. 3 is a simplified schematic view of the implementation of the method of an aspect of the invention.

FIG. 3 symbolically shows a motor vehicle 26 in an inspection and maintenance phase in the certified motor vehicle garage. The motor vehicle 26 is equipped with the electronic computer 2 having the connector 18 and with at least one actuator 4. During the inspection and maintenance phase, the supervision computer 20 is coupled to the connector 18 by way of the connecting cable 21. In the example of FIG. 3, the supervision computer 20 is a portable interface that is well known to those skilled in the art and that will not be described further here.

As a preamble to the disclosure of the method of an aspect of the invention, it is important to mention that it is mandatory for the electronic computer 2 to have been developed with the possibility of changing the parameters of the control signal 22.

Changeable parameters are understood to be the frequency f, the duty cycle a and therefore the duration of the high state t1 and the duration of the low state t2 of the control signal 22.

Also, in one preferred embodiment, values predefined by the motor vehicle 26 manufacturer, such as the frequency f and the duty cycle a of the control signal 22, are already stored in the memory 6. In other words, depending on the characteristics of the actuator 4 and on its environment, the predefined values, also called test values (or test map), are stored in the memory 6. These predefined values are used in an inspection and maintenance phase, as will be described in the remainder of the text of the description. In this same preferred embodiment, the predefined values correspond to the minimum and maximum acceptable values for the actuator 4 depending on its use in the motor vehicle 26. In other words, these predefined values correspond to optimum operating ranges or performance ranges for the actuator 4, which may also be manufacturer data for said actuator 4.

Figure 4:
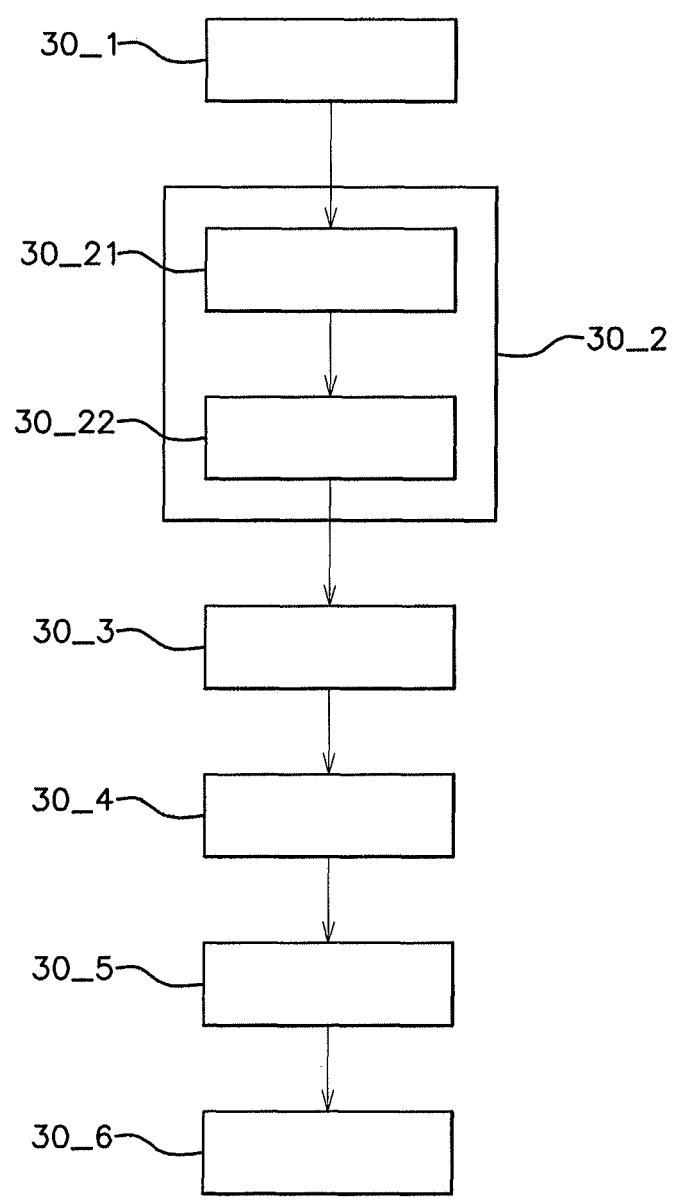
FIG. 4 is a flowchart of the method of an aspect of the invention implemented in FIG. 3.

FIG. 4 shows a flowchart of the inspection and maintenance method according to an aspect of the invention. This method may be partly or fully installed in the supervision computer 20. Once the motor vehicle 26 has been positioned on an inspection and maintenance bench, for example, the supervision computer 20 is coupled to the connector 18 and the inspection and maintenance method is able to be launched.

The launching of said inspection and maintenance method is symbolized by a first step 30_1. During this first step 30_1, the general state of the motor vehicle 26 is for example displayed on a screen of the supervision computer 20. The vehicle type, its mileage, the date of last maintenance and events documented as malfunction events of said motor vehicle 26 may also be displayed. It may thus be displayed for example on the screen of the supervision computer 20 that the actuator 4 exhibits abnormal behavior.

In the remainder of the description, we will place ourselves in this scenario, that is to say that the actuator 4 exhibits behavior that does not correspond to its typical operation in its dedicated environment. Abnormal behavior of the actuator 4 is preferably detected by the electronic computer 2 during use of the motor vehicle 26. As a variant, the abnormal behavior of the motor vehicle could be determined by the qualified individual, for example following a complaint from the driver.

Thus, if the electronic computer 2 has detected the malfunctioning of the actuator 4, then said electronic computer 2 may for example store the number of the actuator 4 at a dedicated location in the memory 6, which is then used to provide information to the qualified individual during the inspection and maintenance phase.

Once the qualified individual has been informed of the malfunctioning of the actuator 4, the method proposes, in a second step 30_2, to perform a test campaign so as to characterize the actuator 4 and to identify the malfunction. This second step 30_2, to simplify its explanation, is divided into two intermediate steps.

Thus, during a first intermediate step 30_21, the method reads predefined values of the frequency f and of the duty cycle a of the control signal 22 from the memory 6. As was mentioned above in the description, the predefined values correspond to the typical operating values given by the manufacturer for the actuator 4 identified as being defective.

As a variant, the memory 6 will have dedicated predefined data for each type of actuator 4. Advantageously, the method will proceed to read the predefined values recorded in the memory 6 depending on the type of defective actuator 4, thus making it possible to perform tests that are tailored to each actuator 4.

In another variant, in addition to the limit operating values of the actuator 4, typical intermediate values may also be stored in the memory 6 in order to check the behavior of the actuator 4 over a dedicated operating range. It is thus possible for example to check the linearity of the response of the actuator 4 and its drift.

Once the predefined values have been read, the method has a second intermediate step 30_22. During this second intermediate step 30_22, the predefined values read from the memory 6 are applied to the corresponding actuator 4 by the control signal 22. The control signal 22 is characterized by its frequency f and its duty cycle a. As mentioned above, the duty cycle a is changed during operation of the actuator 4 and the frequency is kept fixed. Advantageously, the method of an aspect of the present invention provides for changing the values of the frequency f on the basis of the read predefined values with a duty cycle a value that is fixed and considered to be optimum for the actuator 4. The frequency f will be temporarily changed during a test campaign by the predefined values read from the memory 6. Thus, the test campaign may consist for example of the following steps:

applying the control signal 22 with a value of the frequency f of 2 kHz, corresponding to the read predefined value, and with a duty cycle a at 80% for a given time,
applying the control signal 22 with a value of the frequency f of 10 kHz, corresponding to another read predefined value, and with a duty cycle a at 80% for a given time.

In response to the application of this test campaign, the method provides for measuring the response time of the actuator 4, for example. As a variant, the method also provides for measuring the accuracy of the positioning of said actuator 4 in response to the test campaign.

To simplify the description, it has been considered that the actuator 4 is equipped with means for reading its position and its response time. Of course, those skilled in the art will understand that, depending on the type of actuator 4, additional means may be coupled to the actuator 4 in order to obtain these values. As a variant, indirect measurements may also be used to deduce the response time and the positioning of the actuator 4.

Furthermore, in the example of the method given above, it has been proposed to analyze the response time and the accuracy of the positioning of the actuator 4; this is purely illustrative since, of course, depending on the actuator 4 and on its environment, other parameters may also be inspected, such as for example the noise generated by the actuation of the actuator 4.

The method then executes a third comparison step 30_3 for comparing, in this example, the response time and the positioning accuracy of the actuator 4 in the test campaign with reference values stored in the memory 6. Advantageously, the method provides for the electronic computer 2 to have, in the memory 6, reference response time and positioning accuracy values for the actuator 4 depending on the predefined values of the frequency f, which are themselves also stored in the memory 6, for example. The method thus compares the values of the response time and of the positioning accuracy of the actuator 4 when the control signal 22 is applied at a frequency of 2 kHz, and the values of the response time and of the positioning accuracy of the actuator 4 when the control signal 22 is applied at a frequency of 10 kHz.

For example, if the response time of the actuator 4 is below the reference value for the frequency of 2 kHz and it is correct for the frequency of 10 kHz, then it is possible in this case to detect a drift of the actuator 4 at low frequencies. Advantageously, the method of an aspect of the present invention provides a fourth review step 30_4, in which the qualified individual is informed of this drift by way of the screen of the supervision computer 20.

In the remainder of the description, the scenario given is that only the response time of the actuator 4 is subject to a drift at low frequencies, that is to say 2 kHz. Of course, positioning accuracy or noise or other parameters may also be tested. In our example, when the control signal 22 is applied at a frequency of 2 kHz, the response time of the actuator 4 has exceeded the reference value, which in our case corresponds to the maximum response time recommended by the manufacturer for the actuator 4.

The fourth review step 30_4 according to the method of an aspect of the invention analyzes and informs the qualified individual of the drifts or of the defects that have been established for the actuator 4. In our case, the qualified individual is informed by the supervision computer 20 that the response time of the actuator 4 is out of range for low frequencies. The method also provides, as a variant, for a new frequency to be proposed to the qualified individual. This new frequency may for example be the maximum tested frequency, that is to say 10 kHz in our case, but this frequency may also be an intermediate frequency, higher than the low frequency of 2 kHz but lower than the high frequency of 10 kHz, for which the actuator 4 is within its manufacturer range.

A fifth confirmation step 30_5 consists in asking the qualified individual to confirm the new frequency value of the control signal 22. As a variant, several possible frequencies may also be proposed to the qualified individual. Once the frequency has been selected and confirmed, then the method provides a sixth confirmation and recording step 30_6.

During the sixth confirmation and recording step 30_6, the method includes a test phase during which the actuator 4 has the new selected frequency applied to it, and its response time is measured again. If this response time is correct (within the manufacturer range), then the new value of the frequency of the control signal 22 is recorded in the memory 6, and the electronic computer 2 will now use this new frequency upon each activation of the actuator 4.

Of course, the various variables used to detect defects, such as for example the number of the injector 4, are reset to zero.

If the response time of the actuator 4 is out of range with the new frequency value, then the method of an aspect of the present invention informs the qualified individual and relaunches a new test campaign.

What has been shown here is the case of an actuator 4 for which a drift in its response time had been established in the low frequency range. Of course, this is purely illustrative and nonlimiting. Specifically, a drift in the response time in the upper frequency range or even over a frequency band is also able to be detected with the method of an aspect of the invention. Also, the response time is not the only characteristic that is able to be tested and reconfigured by the method presented here. Important parameters for an actuator, such as for example position accuracy or else noise generated when it is activated, may also be measured. In the case of a noise test, the method of an aspect of the invention provides for information on the noise test of the actuator 4 to be displayed on the screen of the supervision computer 20. Thus, for example in the noise test, consent will have to be confirmed by the qualified individual so as to activate the test and also to evaluate the noise generated in said test.

Advantageously, as was mentioned above in the description, a frequency and duty cycle pair for the control signal may also be created by the method of an aspect of the present invention. Such a pair makes it possible to completely reconfigure the actuator in its environment. Furthermore, the method of an aspect of the present invention is not dedicated solely to detecting and reconfiguring the actuator following a defect. The method may also be launched in a routine maintenance phase, thus making it possible to reconfigure the actuator so as to avoid excessive drift and therefore random faults.

Advantageously, such a method also makes it possible to track and predict faults. Specifically, as a variant, it may also be contemplated to track changes in the parameters of the actuator, making it possible to establish an increasingly significant drift of an actuator, and therefore to predict a fault therein, during later maintenance phases.

Another advantage of the method of the an aspect of present invention is that of being able to reconfigure a new actuator that has just been installed in the motor vehicle depending on the ageing of the motor vehicle and on its environment.

Of course, the order of the steps is given with respect to the example presented here, and is therefore purely illustrative. Additional steps may of course be added depending on the actuator or on the set of actuators to be inspected.

Of course, aspects of the present invention are not limited to the preferred embodiment described above and illustrated in the drawing and to the variant embodiments mentioned, but extends to all variants within the scope of those skilled in the art.

The invention claimed is:

1. A method for inspecting and maintaining a motor vehicle including at least one actuator controlled by at least one electronic computer, the electronic computer including a memory, a microcontroller, a power module, a first communication and control bus, a connector, the microcontroller being designed to control the actuator using the power module on the basis of a given strategy, and a supervision means able to be coupled to the connector via a connecting cable so as to logically access the electronic computer, the method comprising:

a) coupling the supervision means to the electronic computer by way of the connector,
b) interrogating the computer using the supervision means and displaying a state of the motor vehicle, if an anomaly is present on at least one actuator and is communicated by the electronic computer to the supervision means, then the method further comprises:
c) identifying a defective actuator,
d) launching a test campaign comprising:
  1) reading predefined values corresponding to the defective actuator from the memory, wherein the predefined values recorded in the memory correspond at least to a first value of a first frequency of the control signal and a second value of a second frequency of the control signal,
  2) applying a control signal with the predefined values read from the memory to the actuator,
  3) measuring actuation parameters of the actuator in response to the application of the control signal,
  4) analyzing the actuation parameters of the actuator in response to the application of the control signal,
e) when the actuation parameters of the actuator in response to the application of the control signal with the predefined values are outside an acceptable range, proposing new values for the control signal,
f) applying the control signal with the new values to the actuator,
g) measuring and analyzing the actuation parameters in response to the application of the control signal with the new values, and
h) when the analysis of the actuation parameters of the actuator in response to the application of the control signal with the new values are within the acceptable range, recording the new control parameters in the electronic computer for subsequent control of the actuator by the electronic computer.

2. The method for inspecting and maintaining a motor vehicle as claimed in claim 1, wherein the control signal has a duty cycle and a frequency that are able to be changed.

3. The method for inspecting and maintaining a motor vehicle as claimed in claim 2, wherein the control signal is a pulse width modulation signal.

4. The method for inspecting and maintaining a motor vehicle as claimed in claim 1, wherein the control signal is a pulse width modulation signal.

5. The method for inspecting and maintaining a motor vehicle as claimed in claim 1, wherein the predefined values recorded in the memory correspond at least to a value of the duty cycle of the control signal.

6. The method for inspecting and maintaining a motor vehicle as claimed in claim 1, wherein, in step d)2), the application of the control signal to the actuator has a variable given duration.

7. The method for inspecting and maintaining a motor vehicle as claimed in claim 1, wherein the actuation parameters of the actuator are a positioning of said actuator.

8. The method for inspecting and maintaining a motor vehicle as claimed in claim 1, wherein the actuation parameters of the actuator are a response time.

9. A supervision computer for inspecting and maintaining a motor vehicle for implementing the method as claimed in claim 1.

10. The method for inspecting and maintaining a motor vehicle as claimed in claim 1 wherein the proposed new values are at least one of a frequency or a duty cycle.

11. The method for inspecting and maintaining a motor vehicle as claimed in claim 1, wherein the actuation parameters of the actuator depend on the predefined values of the first frequency of the control signal and the second frequency of the control signal.

12. The method for inspecting and maintaining a motor vehicle as claimed in claim 1, wherein the actuation parameters of the actuator include at least one of a response time, positioning accuracy, and a noise level of the actuator.

\* \* \* \* \*

UNITED STATES PATENT AND TRADEMARK OFFICE
CERTIFICATE OF CORRECTION

| | |
|---|---|
| PATENT NO. | : 11,772,475 B2 |
| APPLICATION NO. | : 16/332432 |
| DATED | : October 3, 2023 |
| INVENTOR(S) | : Jean-Luc Boyer and Jacques Rocher |

It is certified that error appears in the above-identified patent and that said Letters Patent is hereby corrected as shown below:

In the Claims

In Column 10, Line 31, "h) when the analysis of the actuation parameters...." should read -- h) when the actuation parameters.... --.

Signed and Sealed this
Sixteenth Day of April, 2024

Katherine Kelly Vidal
Director of the United States Patent and Trademark Office